E. J. SCHOWALTER.
WINDOW CLEANER.
APPLICATION FILED NOV. 19, 1906.
974,193.
Patented Nov. 1, 1910.
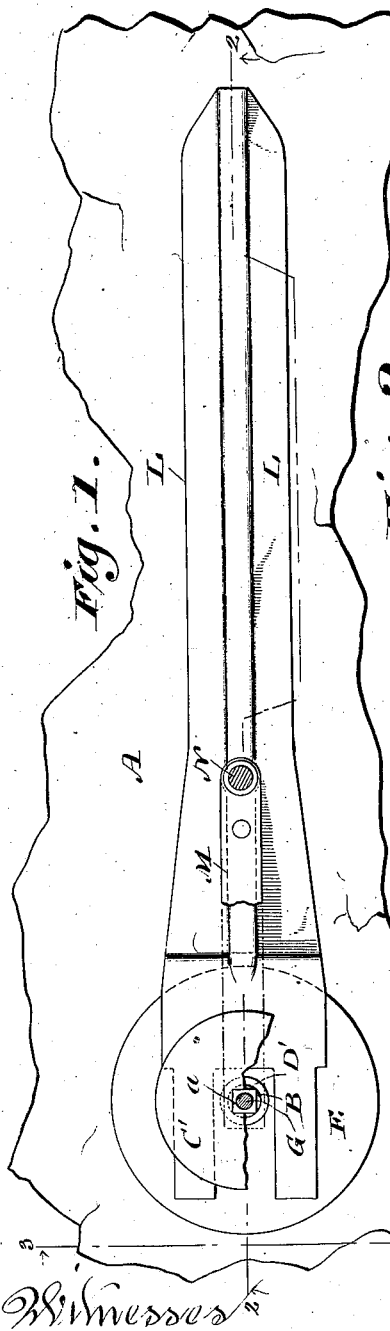
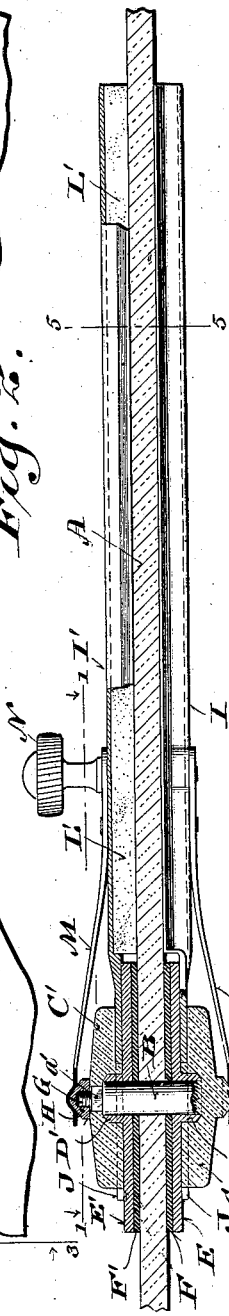
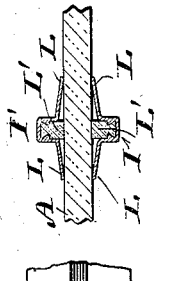
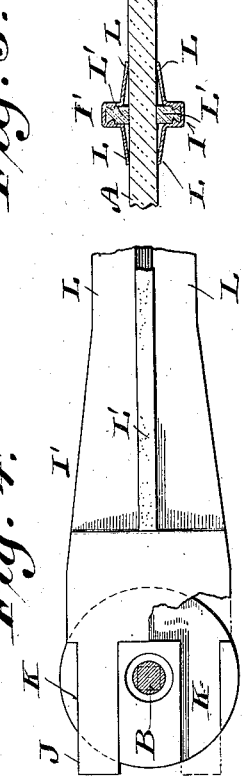
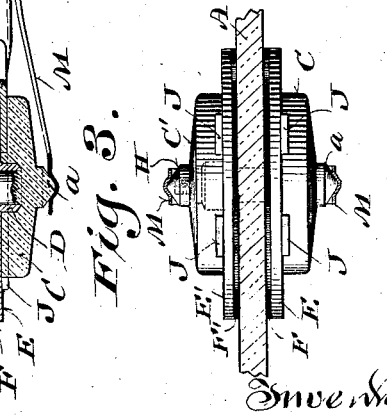

UNITED STATES PATENT OFFICE.

EDWARD J. SCHOWALTER, OF RACINE, WISCONSIN.

WINDOW-CLEANER.

974,193.  Specification of Letters Patent.  Patented Nov. 1, 1910.

Application filed November 19, 1906. Serial No. 344,008.

*To all whom it may concern:*

Be it known that I, EDWARD J. SCHOWALTER, a citizen of the United States, and resident of Racine, in the county of Racine and State of Wisconsin, have invented certain new and useful Improvements in Window-Cleaners; and I do hereby declare that the following is a full, clear, and exact description thereof.

The object of my invention is to provide means for clearing window-glass of deposited vapor, moisture or ice, so that vision through the glass is unobstructed, said means comprising a pair of pivoted scrapers and wipers arranged to contact with both surfaces of the glass, and be actuated by hand to clear the same as occasion may require.

The invention therefore consists in certain peculiarities of construction and combination of parts as hereinafter fully set forth with reference to the accompanying drawings and subsequently claimed.

In the drawings: Figure 1 represents a front view of a scraping and wiping means embodying the features of my invention, an arm of same being shown attached to a fragment of glass with parts broken away and parts in section, as indicated by line 1—1 of Fig. 2; Fig. 2, a longitudinal section of the same, as indicated by line 2—2 of Fig. 1; Fig. 3, an end view with the glass in section, as indicated by line 3—3 of Fig. 1; Fig. 4, a detail inverted plan view of a portion of one of the scraper-arms and washer into which the same is countersunk, and Fig. 5, a cross-section of the arms on line 5—5 of Fig. 2.

Referring by letter to the drawings, A indicates a plate of transparent glass for a car, locomotive-window, or the like, the same being bored to receive a cylindrical post B, which extends from and forms part of an enlarged cap or washer C, having a conical head $a$ as shown. The washer is counterbored concentric with its post to receive a gland D of a metal disk E, which is preferably of greater diameter than the washer, and interposed between the disk and glass is a gasket F of soft material, preferably rubber.

The cylindrical post B projects through the glass, and has fitted thereon, adjacent to the glass surface, another gasket F' over which is placed a disk E' having a gland D', said disk being similar to the one previously described. At the point where the post B comes flush with the gland of the last named disk, said post is formed with a reduced squared shank $a'$, to receive a washer C', that has a counterbored opening to fit the gland of the disk E', the counter-bore opening being thereafter reduced and squared to receive the squared shank of the aforesaid post.

A screw-threaded extension G of the post projects beyond the face of the washer C', to receive a blind conical nut H, that serves to bind the several parts together and form a tightly clamped pivot-joint, that is so cushioned against the faces of the glass as to render breakage thereof, through variation of temperature, virtually impossible.

Owing to the shoulder-post the draw or clamping strain upon the glass is regulated by the thickness or yield of the gaskets, which thickness may be varied in order to get a uniform clamping strain when a glass of different thickness than that shown is used.

Scraping-arms I, I', are detachably fitted between the washer and disk members of the joint, the construction of the arms being as follows:—The shank-portion of each arm consists of a flat plate having forked extensions J, which are adapted to enter corresponding recesses formed by the disks and countersunk channels K, K', of the washers, the channels being of depth equal to the thickness of the forks, and connected by a cross-cut to form shoulders against which the base of the forked end of the shank abuts. From the shanks the arms are pressed or otherwise formed into grooved fingers having flared scraping-edges L, which edges contact with the surface of the glass, the center groove being dove-tailed to receive a similarly dove-tailed wiper strip L', which has rubbing-contact with the glass at its lower edge, said strip being of any suitable material, either rubber or absorbing.

Each arm has a detent spring M secured thereto, its free end being indented to engage and lock under tension over the conical nut or head of the washer into which said arm is fitted, there being a handle N projecting from one of the aforesaid arms for the purpose of rotating the same, it being understood that the handle is upon the arm on that side of the glass adjacent the operator.

By the above described apparatus it will be seen that when the glass becomes blurred from atmospheric conditions, the operator simply rotates the arm by grasping the handle, said arm describing an arc, thereby rotating the washer upon the disk, which disk will remain stationary through frictional contact with the gasket, and the rotary motion thus obtained is imparted through the post to the outside washer, which in turn revolves the arm carried thereby, and cleans the outside surface of the glass simultaneously with the cleaning of the inner surface thereof.

Normally the springs M lie close along the arms, but when the shanks of these arms are engaged with the pivot-joint in connection with the glass, the free ends of said springs are lifted and allowed to snap into place on the conical head $a$ of one of the washers and the conical end $a'$ of the nut H respectively, said springs being then under tension to not only lock said arms in said joint, but also to exert a pressure by which the aforesaid arms are held tight against the faces of said glass so as to produce the most efficient results when operated to scrape ice or sleet from the same.

If the apparatus is not in use, or should the arms be in the way, when it is desired to raise or lower the window to which they are attached, said arms may be readily disengaged from the joint.

By the provision for attaching the wiper-strips, the latter when worn may readily be replaced, or different grades of wipers inserted in the arms, depending upon the climate or conditions to be contended with.

The invention herein particularly set forth is particularly applicable to the pilot windows of motor cars, locomotives, marine vessels and automobiles.

I claim:

1. A window-glass cleaner comprising a pair of channeled washers, a post that extends from one of the washers through an aperture in the glass and engages the other of said washers, gaskets opposing the sides of said glass, disks interposed between the gaskets and washers, and glass cleaning arms having shanks in detachable engagement with the washer-channels against said disks.

2. A window-glass cleaner comprising a pair of channeled washers, a post that extends from one of the washers through an aperture in the glass and engages the other of said washers, gaskets opposing the sides of the glass, disks interposed between the gaskets and washers, glass-cleaning arms having shanks in detachable engagement with the washer-channels against said disks, and springs in connection with said arms for locking engagement with the aforesaid washers.

In testimony that I claim the foregoing I have hereunto set my hand at Racine, in the county of Racine and State of Wisconsin in the presence of two witnesses.

EDWARD J. SCHOWALTER.

Witnesses:
  WM. SMIEDING, Jr.,
  GEORGE A. KEHL.